Dec. 23, 1969  E. F. WEHINGER  3,485,039
EXHAUST GAS TREATING DEVICE
Filed Dec. 29, 1967  3 Sheets-Sheet 1
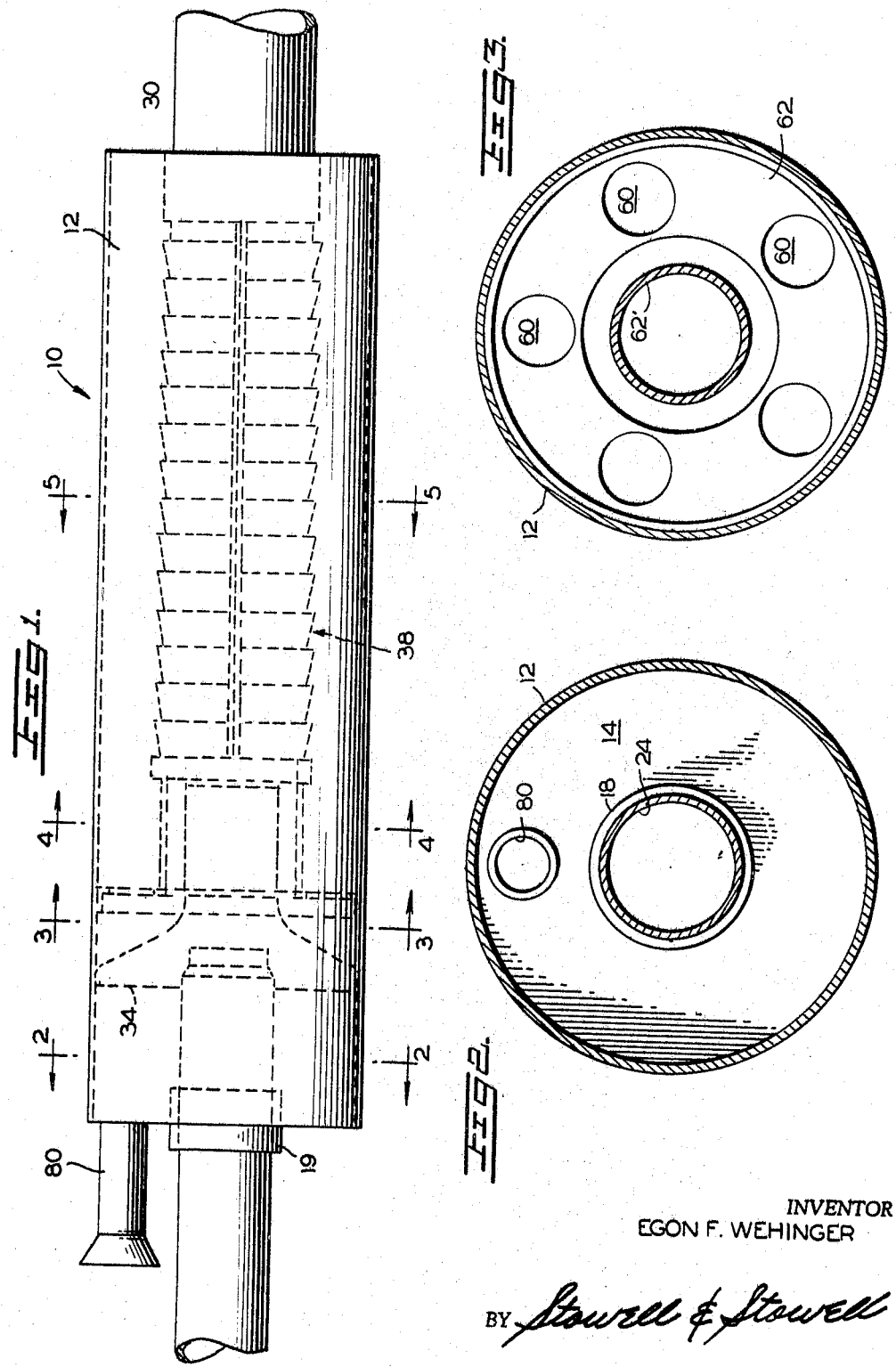
INVENTOR
EGON F. WEHINGER
BY Stowell & Stowell
ATTORNEYS

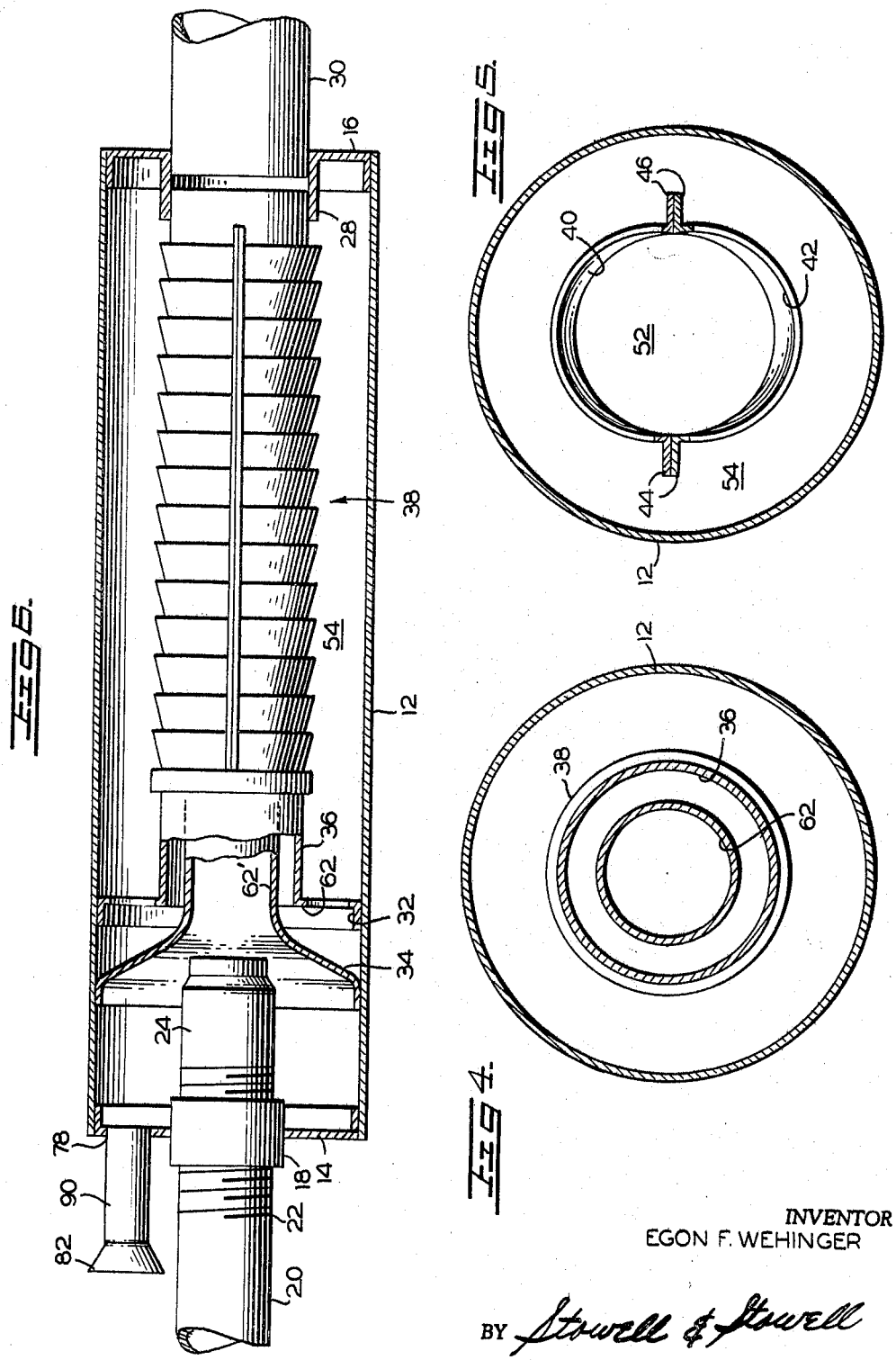

Dec. 23, 1969  E. F. WEHINGER  3,485,039
EXHAUST GAS TREATING DEVICE
Filed Dec. 29, 1967  3 Sheets-Sheet 3
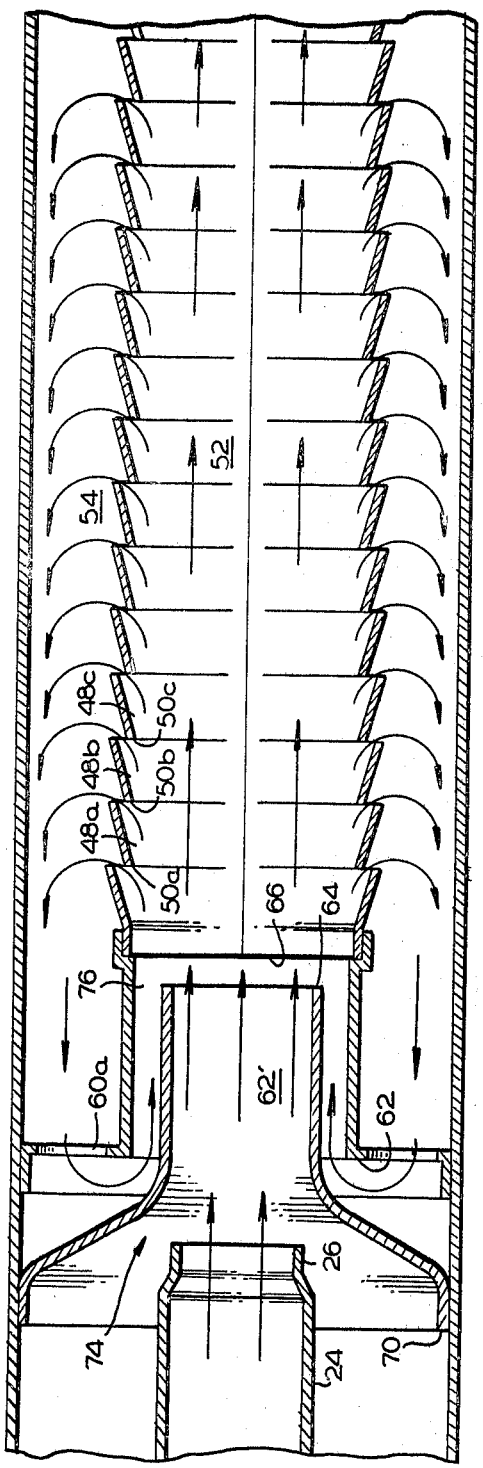
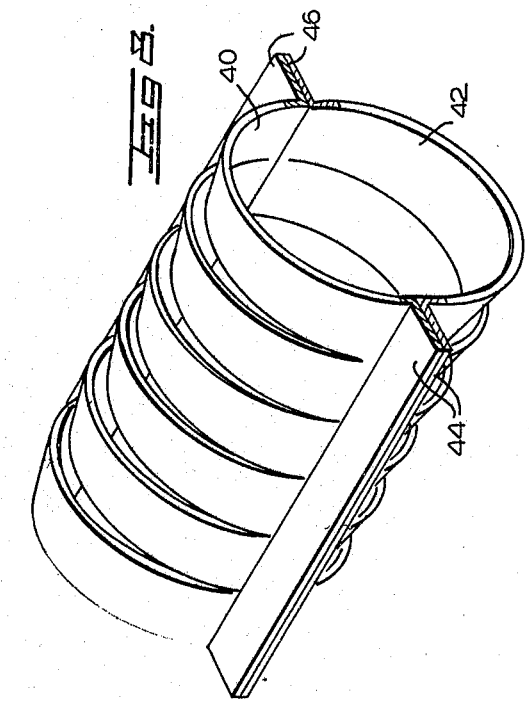
INVENTOR
EGON F. WEHINGER
BY *Stowell & Stowell*
ATTORNEYS

United States Patent Office 3,485,039
Patented Dec. 23, 1969

3,485,039
EXHAUST GAS TREATING DEVICE
Egon F. Wehinger, Rio de Janeiro, Brazil, assignor to Hugh Oliver, Jacksonville Beach, Fla.
Filed Dec. 29, 1967, Ser. No. 694,557
Int. Cl. F01n 1/14
U.S. Cl. 60—30          9 Claims

ABSTRACT OF THE DISCLOSURE

An exhaust gas treating device having a pair of chambers for interaction between gases issuing from an internal combustion engine and ambient atmosphere. The device includes a pair of generally concentric venturi passages which insure good mixing of the exhaust gas and the atmosphere and a predetermined flow path for the gases.

Background

It is known to provide mufflers and/or exhaust gas treating devices for internal combustion engines which include means for mixing exhaust gases with ambient atmosphere pumped or drawn into the treating device. It is an object of the present invention to provide a device for treating exhaust gases issuing from internal combustion engines which ensures controlled mixing of the hot exhaust gases with a predetermined amount of air; highly turbulent treating chambers where interaction between the air and the exhaust gases may take place; and means for ensuring controlled flow of the exhaust-air mixture through the treating chambers.

A further object is to provide such a device as may be readily adjusted to vary the amount of air to be mixed with the hot exhaust gases.

Further objects are to provide an improved exhaust gas treating device that is efficient in operation, relatively inexpensive and having a relatively low power consumption.

These and other objects and advantages are provided by an exhaust gas treating device including first venturi means for drawing ambient air into exhaust gases issuing from an internal combustion engine, first and second treating chambers for the air and exhaust gas; second venturi means for drawing the exhaust gas and air mixture through the first and second treating chambers and back into the first treating chamber, and an outlet conditioned gas from the first treating chamber remote from the first and second venturi means.

The invention will be more particularly described in reference to the accompanying drawings wherein:

FIGURE 1 is a side-elevational view of an exhaust gas treating device constructed in accordance with the teachings of the invention;
FIGURE 2 is a section on line 2—2 of FIGURE 1;
FIGURE 3 is a section on line 3—3 of FIGURE 1;
FIGURE 4 is a section on line 4—4 of FIGURE 1;
FIGURE 5 is a section on line 5—5 of FIGURE 1;
FIGURE 6 is a view similar to FIGURE 1 with portions of certain of the structures broken away to more fully illustrate the form of the exhaust gas treating device;
FIGURE 7 is an enlarged fragmentary sectional view of the device shown in FIGURES 1 and 6; and
FIGURE 8 is a perspective view of a portion of the gas flow control wall means between the first and second gas treating chambers.

Referring to the drawings 10 generally designates the improved gas treating device of the invention and the device 10 generally comprises an outer housing or casing 12 which, in the preferred form of the invention, is circular in transverse section and is provided with end closure plates 14 and 16. While in the illustrated form of the invention the casing 12 is illustrated as being circular in transverse section, it will be appreciated by those skilled in the art that the housing may be, for example, elliptical in transverse section without departing from the scope of the present invention.

Closure plate 14 has centrally mounted therein a bushing 18 which is internally threaded. The bushing 18 threadedly receives a pipe or conduit 20 having external threads 22 about a portion of its length. The pipe 20 is connected to the exhaust headers of an internal combustion engine not shown in the drawings, while the inner end 24 of the pipe 20 projects into the cylindrical housing 12. The end 24 of the pipe 20 terminates in a reduced diameter section 26, as more clearly shown in FIGURE 7 of the drawings.

End closure plate 16 is also provided with a centrally positioned ferrule 28 which receives, in the outer portion thereof, treated exhaust outlet pipe 30.

Between end closure plates 14 and 16 are mounted a pair of transverse partition members 32 and 34. Partition member 34 is provided with a centrally positioned cylindrical ferrule 36, and ferrule 36 and the inner end of ferrule 38 receive opposite ends of an elongated, perforated and generally cylindrical partition member 38.

The member 38 is preferably formed from a pair of plates 40 and 42 which are stamped or pressed into generally semi-cylindrical form with side wing portions 44 and 46 which are welded together. Between the wing portions 44 and 46 each of the semi-cylindrical elements 40 and 42 comprises a plurality of vane portions 48a, b, c, etc., with the upstream edges 50a, b, c, etc. sloping toward the axis of the formed cylinder.

The above described partition member thus provides a plurality of passages for directing gases from an inner or first treating chamber 52 to an outer annular or second treating chamber 54.

The partition member 32 is also provided with a plurality of openings 60a, b, c, etc., through the annular wall 62 as more clearly shown in FIGURE 3 of the drawings. While five such openings, generally circular in form, are illustrated, a greater number of openings may be provided and the openings need not be round.

Partition member 34 is generally funnel shaped with the reduced diameter portion 62' projecting into the ferrule 36 of partition member 32. It will be noted from FIGURE 7 that the downstream end 64 of the partition 34 terminates upstream of the upstream end 66 of the partition member 38.

The reduced diameter portion 26 of inlet pipe 24 terminates intermediate the upstream end 70 and the downstream end 64 of the funnel-shaped partition member 34. The zone generally designated 74 comprises a first venturi passage while the zone generally designated 76 forms a second venturi passage, the functions of which will be more fully described hereinafter.

End plate 14 is provided with at least one further opening 78 which receives a cylindrical pipe 80. The pipe 80 comprises an inlet pipe for the ambient atmosphere and its upstream end may be flared as at 82 so that a portion of the energy required to force air into and through the exhaust gas treating device 10 may be derived from the ram air effect of a vehicle. Where desired, a conventional compressor or a fan may be installed in association with the pipe 80. This form of construction would be particularly advantageous where the internal combustion engine is of the stationary type.

Operation

With the pipe 20 connected to an exhaust header of an internal combustion engine, the hot exhaust gases issuing from reduced diameter section 26 of pipe 24 creates a suction in venturi passage 74 thus drawing, into the reduced diameter portion 62' of the funnel-shaped partition 34, ambient atmosphere via pipe 80.

The mixing of the air and the hot exhaust gases in passage 62 causes uncombusted hydrocarbons, carbon, partially oxidized carbon and partially oxidized sulfur compounds to undergo further oxidation with the generation of heat. The hot combustion products flow into treatment chamber 52 where a substantial portion thereof are directed by vanes 48a, b, c, etc., into the second treating chamber 54. The gases entering the second treatment chamber 54 reverse direction and are drawn through the plural opening 60a, b, c, etc., into the annular venturi passage 76. While flowing in the annular passage 76 the gases are reheating by radiation and convection from the hot wall of the reduced diameter portion 62 of the funnel-shaped partition member 70. The reheated gases then flow into the first treatment chamber to be mixed with the incoming gases from the engine as hereinbefore described. Continuous with the foregoing flow path, the treated exhaust issues from the outlet pipe 30 which may exhaust to atmosphere or be connected to a conventional automotive silencer or muffler.

The amount of air drawn into the exhaust gas treating device may be controlled over a wide range by adjusting the position of the outlet end 26 of pipe 24 relative to the upstream end of the funnel-shaped partition 70. Such adjustment may be conveniently made by the cooperating threads on the external side of the pipe 24 and the internal threads on the ferrule or pipe 18.

In a preferred embodiment of the present invention, the following table sets forth the size relationship between the primary structures of the treating device:

|  | Inches |
|---|---|
| Internal diameter of casing 12 | 6 |
| Length of casing 12 | 21½ |
| Internal diameter of pipe 24 | 2 |
| Internal diameter of pipe 80 | 1 |
| Internal diameter of reduced portion 62 of partition 34 | 2⅛ |
| Internal diameter of outlet section 26 | 1 15/16 |
| Internal diameter of ferrule 36 | 2¾ |
| Length of cylindrical partition member 38 | 13½ |
| Distance between end plate 14 and partition 32 | 5 |

The dimensions set forth above are illustrative only and are not to be construed as limiting the scope of the present invention.

I claim:
1. An exhaust gas treating device comprising first and second elongated concentric treating chambers, an exhaust gas inlet in to the first treating chamber, first venturi passage means between the exhaust gas inlet and the first treating chamber for drawing ambient air into the first treating chamber, gas directing vane means connecting the first and second treating chambers and forming a major portion of the wall between said chambers, second venturi passage means for drawing the exhaust gas and air mixture successively through the first and second treating chambers and back into the first treating chamber, and an outlet for conditioned gas from the first treating chamber remote from the exhaust gas and air inlet into the first treating chamber.

2. The invention defined in claim 1 wherein the exhaust gas inlet and the conditioned gas outlet are axially aligned.

3. The invention defined in claim 1 wherein the first venturi passage means is adjustable.

4. The invention defined in claim 1 wherein the exhaust gas and air mixture is reheated in flowing through the second venturi passage means.

5. An exhaust gas treating device comprising first and second elongated concentric treating chambers, an exhaust gas inlet into the first treating chamber, first venturi passage means between the exhaust gas inlet and the first treating chamber for drawing ambient air into the first treating chamber, gas directing vane means connecting the first and second treating chambers; said gas directing vane means comprise a plurality of axially aligned slot forming members having upstream ends projecting into the first treating chamber and their down stream ends projecting into the second treating chamber, second venturi passage means for drawing the exhaust gas and air mixture successively through the first and second treating chambers and back into the first treating chamber, and an outlet for conditioned gas from the first treating chamber remote from the exhaust gas and air inlet into the first treating chamber.

6. The invention defined in claim 5 wherein the vane means extend substantially the length of the first treating chamber.

7. The invention defined in claim 6 wherein the second treating chamber is in the form of an annulus about the first treating chamber.

8. An exhaust gas treating device including first venturi passage means for drawing ambient air into the exhaust gas issuing from an internal combustion engine, first and second elongated concentric treating chambers for the air and exhaust gas, a second venturi passage means for drawing the exhaust gas and air mixture successively through the first and second treating chambers and back into the first treating chamber, and an outlet for conditioned gas from the first treating chamber remote from the first and second venturi passage means and a gas flow control vane means forming a substantial portion of the wall between the first and second treating chambers.

9. The invention defined in claim 8 wherein the exhaust gas inlet and the conditioned gas outlet are axially aligned.

References Cited

UNITED STATES PATENTS

| 1,076,494 | 10/1913 | Galaine | 181—44 |
| 1,658,402 | 2/1928 | Warth | 181—51 |
| 1,794,276 | 2/1931 | Bowes | 181—51 |
| 2,150,768 | 3/1939 | Hedrick | 181—44 |
| 2,216,653 | 10/1940 | Sauer | 60—30 |

CARLTON R. CROYLE, Primary Examiner

D. HART, Assistant Examiner

U.S. Cl. X.R.

181—44, 51